(12) United States Patent
Xiong et al.

(10) Patent No.: US 11,202,338 B2
(45) Date of Patent: Dec. 14, 2021

(54) SESSION ESTABLISHMENT METHOD AND APPARATUS

(71) Applicant: Huawei Technologies Co., Ltd., Shenzhen (CN)

(72) Inventors: Chunshan Xiong, Shenzhen (CN); Ruizhi Liu, Shenzhen (CN); Anni Wei, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/810,660

(22) Filed: Mar. 5, 2020

(65) Prior Publication Data

US 2020/0205226 A1 Jun. 25, 2020

Related U.S. Application Data

(63) Continuation of application No. PCT/CN2018/104680, filed on Sep. 7, 2018.

(30) Foreign Application Priority Data

Sep. 8, 2017 (CN) .......................... 201710806432.5

(51) Int. Cl.
*H04W 80/10* (2009.01)
*H04W 76/30* (2018.01)
(Continued)

(52) U.S. Cl.
CPC .......... *H04W 80/10* (2013.01); *H04M 15/66* (2013.01); *H04W 28/10* (2013.01); *H04W 76/30* (2018.02); *H04W 92/10* (2013.01)

(58) Field of Classification Search
CPC ..... H04W 80/10; H04W 76/30; H04W 28/10; H04W 92/10; H04M 15/66
(Continued)

(56) References Cited

U.S. PATENT DOCUMENTS

2016/0171102 A1 6/2016 Pandya
2018/0199243 A1* 7/2018 Bharatia ........... H04W 36/0055
(Continued)

FOREIGN PATENT DOCUMENTS

CN 101686563 A 3/2010
CN 106851856 A 6/2017
(Continued)

OTHER PUBLICATIONS

"Pseudo-CR on 5G SM sublayer states," 3GPP TSG-CT WG1 Meeting #104, C1-172193, Zhangjiajie, P.R of China, Total 5 pages, 3rd Generation Partnership Project, Valbonne, France (May 15-19, 2017).
(Continued)

*Primary Examiner* — Obaidul Huq
(74) *Attorney, Agent, or Firm* — Leydig, Voit & Mayer, Ltd.

(57) ABSTRACT

A session establishment method and apparatus are provided. The method includes: determining, by a first network device, whether an air interface resource of a default flow of a PDU session is successfully established; and if the air interface resource of the default flow of the PDU session fails to be established, the first network device, based on first information, establishes the PDU session in an inactive state or triggers to release the PDU session, where the first information is used to indicate whether establishment of the PDU session in the inactive state is allowed when the air interface resource of the default flow of the PDU session fails to be established.

13 Claims, 9 Drawing Sheets

(51) Int. Cl.
H04M 15/00 (2006.01)
H04W 28/10 (2009.01)
H04W 92/10 (2009.01)

(58) Field of Classification Search
USPC .......................................... 370/310, 328, 329
See application file for complete search history.

(56) References Cited

U.S. PATENT DOCUMENTS

2018/0376444 A1* 12/2018 Kim .................. H04W 4/70
2020/0187088 A1* 6/2020 Chun ................. H04L 69/322

FOREIGN PATENT DOCUMENTS

| CN | 107018542 A | 8/2017 |
| WO | 2015008989 A1 | 1/2015 |
| WO | 2016160753 A2 | 10/2016 |

OTHER PUBLICATIONS

"Text Proposal for Default QoS," 3GPP TSG-RAN WG3 Meeting#97, Berlin, Germany, R3-173057, pp. 1-2, 3rd Generation Partnership Project, Valbonne, France (Aug. 21-25, 2017).
"Pseudo-CR on 5G SM sublayer states," 3GPP TSG-CT WG1 Meeting #104, Zhangjiajie, P.R. of China, C1-172637, XP051284371, pp. 1-5, 3rd Generation Partnership Project, Valbonne, France (May 15-19, 2017).
"3rd Generation Partnership Project; Technical Specification Group Services and System Aspects; General Packet Radio Service (GPRS) enhancements for Evolved Universal Terrestrial Radio Access Network (E-UTRAN) access (Release 15)," 3GPP TS 23.401 V15.0.0, pp. 1-386, 3rd Generation Partnership Project, Valbonne, France (Jun. 2017).
"TS23.501: Clarification for the default QoS flow, notification control and 5QI," SA WG2 Meeting #122Bis, Sophia Antipolis, France, S2-175610 (revision of S2-17xxxx), pp. 1-13, 3rd Generation Partnership Project, Valbonne, France (Aug. 21-25, 2017).
"3rd Generation Partnership Project; Technical Specification Group Core Network and Terminals; 5G System—Phase 1; CT WG1 Aspects (Release 15)," 3GPP TR 24.890 V0. 2.1, XP051450218, pp. 1-71, 3rd Generation Partnership Project, Valbonne, France (Jun. 2017).
"3rd Generation Partnership Project; Technical Specification Group Services and System Aspects; Procedures for the 5G System; Stage 2 (Release 15)," 3GPP TS 23.502 V0.6.0, pp. 1-148, 3rd Generation Partnership Project, Valbonne, France (Aug. 2017).
"Supporting home routed PUD session in TS 23.502," 3GPP TSG SA WG2 Meeting #121, San Jose Del Cabo, Mexico S2-174283 (revision of S2-17), pp. 1-9, 3rd Generation Partnership Project, Valbonne, France (Jun. 26-30, 2017).
"3rd Generation Partnership Project; Technical Specification Group Services and System Aspects; Security Architecture and Procedures for 5G System (Release 15)," 3GPP TS 33.501 V0.3.0, total 44 pages, 3rd Generation Partnership Project, Valbonne, France (Aug. 2017).

* cited by examiner

SESSION ESTABLISHMENT METHOD AND APPARATUS

CROSS-REFERENCE TO RELATED APPLICATIONS

This application is a continuation of International Application No. PCT/CN2018/104680, filed on Sep. 7, 2018, which claims priority to Chinese Patent Application No. 201710806432.5, filed on Sep. 8, 2017. The disclosures of the aforementioned applications are hereby incorporated by reference in their entireties.

TECHNICAL FIELD

Embodiments of this application relate to the field of communications technologies, and in particular, to a session establishment method and apparatus.

BACKGROUND

A packet data unit (PDU) session is a session between a terminal and a data network (DN), to provide a PDU connectivity service. The PDU connectivity service is a service that provides a PDU exchange between the terminal and the DN determined from a data network name (DNN).

In a radio communications system, data transmission is based on a radio bearer (RB). The radio communications system divides data into one or more RBs based on quality of service (QoS) requirements of various applications. One RB may be divided into a plurality of QoS flows, which is referred to as a flow or a flow in the following. One PDU session includes at least one flow, and one of the flows is a default flow. The default flow is a flow processed by using a default QoS rule. The default QoS rule is the only QoS rule in the PDU session that may not include a packet filter.

During establishment of the PDU session, a base station establishes a corresponding air interface resource for each flow included in the PDU session, and the air interface resource of each flow is independently established. A process of establishing the air interface resource for a QoS Flow may succeed or fail. During establishment of a PDU session user plane resource, successful establishment of an air interface resource of a default flow of the PDU session represents that the PDU session has been successfully established. Correspondingly, if establishment of an air interface resource of a default flow of a PDU session fails, it represents that the PDU session is not successfully established.

In a future 5G communications system, when an air interface resource of a default flow of a PDU session fails to be established, with regard to how to process the PDU session, there is no specific solution.

SUMMARY

This application provides a session establishment method and apparatus, to provide a processing method for establishing a PDU session.

According to a first aspect, an embodiment of this application provides a session establishment method, including:

determining, by a first network device, whether an air interface resource of a default flow of a PDU session is successfully established;

if the air interface resource of the default flow of the PDU session fails to be established, establishing, by the first network device based on first information, the PDU session in an inactive state or triggering to release the PDU session, where the first information is used to indicate whether establishment of the PDU session in the inactive state is allowed when the air interface resource of the default flow of the PDU session fails to be established.

According to the foregoing method, when determining that the air interface resource of the default flow of the PDU session fails to be established, the first network device may establish the PDU session in the inactive state or trigger to release the PDU session, thereby providing a mechanism for further processing the PDU session when the air interface resource of the default flow of the PDU session fails to be established, and resolving a problem of how to determine to establish the PDU session in the inactive state.

According to a second aspect, an embodiment of this application provides a session establishment method, including:

determining, by a first network device, whether an air interface resource of a default flow of a PDU session is successfully established, where the PDU session is in an inactive state;

if the air interface resource of the default flow of the PDU session fails to be established, maintaining, by the first network device based on first information, the PDU session in the inactive state or triggering to release the PDU session, where the first information is used to indicate whether to allow the PDU session to be maintained in the inactive state when the air interface resource of the default flow of the PDU session fails to be established.

According to the foregoing method, when determining that the air interface resource of the default flow of the PDU session in the inactive state fails to be established, the first network device may maintain the PDU session in the inactive state or trigger to release the PDU session in the inactive state, thereby providing a mechanism for further processing the PDU session when the air interface resource of the default flow of the PDU session in the inactive state fails to be established, and resolving a problem of how to determine whether to maintain the PDU session in the inactive state.

Optionally, the determining, by a first network device, whether an air interface resource of a default flow of a PDU session is successfully established includes:

obtaining, by the first network device, a flow list, where the flow list is generated by a second network device based on an establishment result of the air interface resource of the PDU session, and the flow list includes a flow that is in the PDU session and of which an air interface resource fails to be established; and determining, by the first network device based on the flow list, whether the air interface resource of the default flow of the PDU session is successfully established.

According to the foregoing method, the first network device can quickly and accurately determine the establishment result of the air interface resource of the default flow of the PDU session through the flow list that includes the flow of which the air interface resource in the PDU session fails to be established, thereby improving accuracy of determining whether the air interface resource of the default flow of the PDU session is successfully established.

Optionally, the first information is a slice/service type in subscription data of a terminal corresponding to the PDU session.

Alternatively, the first information is a policy and charging control rule of the terminal corresponding to the PDU session.

Alternatively, the first information is indication information sent by the terminal to the first network device.

Optionally, the method further includes:

obtaining, by the first network device, second information, where the second information is used to indicate a time point at which the PDU session in the inactive state is activated; and after the establishing, based on first information, the PDU session in the inactive state, the method further includes:

activating, by the first network device, the PDU session in the inactive state at the time point indicated by the second information; or sending, by the first network device, the second indication information to the terminal, where the second indication information is used to instruct the terminal to activate the PDU session in the inactive state at the time point.

In the foregoing method, the first network device activates the PDU session in the inactive state at the time point indicated by the second information, so that a time and a network resource for establishing the PDU session can be saved. Compared with re-establishing the PDU session, efficiency of establishing the PDU session can be improved, so that a user plane resource of the PDU session can be established faster.

Optionally, the method further includes:

obtaining, by the first network device, third information, where the third information is used to indicate a maximum quantity of times for which the PDU session in the inactive state is activated; and after the activating, by the first network device, the PDU session in the inactive state at the time point indicated by the second information, the method further includes:

if determining that a quantity of times for which the PDU session in the inactive state is activated is equal to the maximum quantity of times, triggering, by the first network device, a procedure of releasing the PDU session.

Optionally, after the determining, by the first network device, that the air interface resource of the default flow of the PDU session fails to be established, the method further includes:

if determining, based on the first information, that establishment of the PDU session in the inactive state is not allowed, triggering, by the first network device, to establish a user plane resource for the PDU session when determining that at least one flow of which an air interface resource is successfully established exists in at least one flow included in the PDU session; or if determining, based on the first information, that establishment of the PDU session in the inactive state is not allowed, sending, by the first network device, a quality of service parameter of the default flow to the second network device, and instructing the second network device to establish an air interface resource for the default flow based on the quality of service parameter of the default flow.

In the foregoing method, the first network device can continue to establish the user plane resource for the PDU session when the air interface resource of the default flow of the PDU session fails to be established, so that the user plane resource of the PDU session can be established faster.

Optionally, after the establishing, based on first information, the PDU session in the inactive state, the method further includes:

releasing, by the first network device, the air interface resource of the flow that is in the PDU session and of which the air interface resource is successfully established.

In the foregoing method, the first network device releases the air interface resource of the flow that is in the PDU session and of which the air interface resource is successfully established, and the released resource may be reused, thereby improving resource utilization.

According to a third aspect, an embodiment of this application provides a session establishment apparatus. The communications apparatus includes a memory, a transceiver and a processor, where the memory is configured to store an instruction, the processor is configured to execute the instruction stored in the memory and control the transceiver to receive and send signals. When the processor executes the instruction stored in the memory, a terminal is configured to perform the method according to the first aspect or any one of the possible designs of the second aspect.

According to a fourth aspect, an embodiment of this application provides a session establishment apparatus. The session establishment apparatus is configured to implement any method according to the first aspect or the second aspect, and includes corresponding functional modules, such as a processing unit, a receiving unit, and sending unit, that are separately configured to implement the steps in the foregoing method.

According to a fifth aspect, an embodiment of this application provides a computer-readable storage medium. The computer storage medium stores a computer-readable instruction. When a computer reads and executes the computer-readable instruction, the computer is enabled to perform the method according to the first aspect or any one of the possible designs of the second aspect.

According to a sixth aspect, an embodiment of this application provides a computer program product. When a computer reads and executes the computer program product, the computer is enabled to perform the method according to the first aspect or any one of the possible designs of the second aspect.

According to a seventh aspect, an embodiment of this application provides a chip. The chip is connected to a memory, and is configured to read and execute a software program stored in the memory, to implement the method according to the first aspect or any one of the possible designs of the second aspect.

According to an eighth aspect, an embodiment of this application provides a session establishment method, including:

generating, by a terminal, first information, where the first information is used to indicate whether establishment of a PDU session in an inactive state is allowed when an air interface resource of a default flow of the PDU session fails to be established; and sending, by the terminal, the first information to a first network device through a second network device.

In the foregoing method, the terminal indicates, by sending the first information to the first network device, whether establishment of the PDU session in the inactive state is allowed, so that when determining that the air interface resource of the default flow of the PDU session fails to be established, the first network device may establish the PDU session in the inactive state, thereby providing a mechanism for further processing the PDU session when the air interface resource of the default flow of the PDU session fails to be established.

Optionally, the PDU session is established in an inactive state.

The method further includes:

receiving, by the terminal, second indication information sent by the first network device through the second network device, where the second information is used to indicate a time point at which the PDU session in the inactive state is activated; and sending, by the terminal, an activation request message to the second network device at the time point indicated by the second indication information, where the activation request message is used to request to activate the PDU session in the inactive state.

According to a ninth aspect, an embodiment of this application provides a session establishment apparatus. The communications apparatus includes a memory, a transceiver and a processor, where the memory is configured to store an instruction, the processor is configured to execute the instruction stored in the memory and control the transceiver to receive and send signals. When the processor executes the instruction stored in the memory, the terminal is configured to perform the method according to any one of the possible designs of the eighth aspect.

According to a tenth aspect, an embodiment of this application provides a session establishment apparatus. The session establishment apparatus is configured to implement any method according to the eighth aspect, and includes corresponding functional modules, such as a processing unit, a receiving unit, and sending unit, separately configured to implement the steps in the foregoing method.

According to an eleventh aspect, an embodiment of this application provides a computer-readable storage medium. The computer storage medium stores a computer-readable instruction. When a computer reads and executes the computer-readable instruction, the computer is enabled to perform the method according to any one of the possible designs of the eighth aspect.

According to a twelfth aspect, an embodiment of this application provides a computer program product. When a computer reads and executes the computer program product, the computer is enabled to perform the method according to any one of the possible designs of the eighth aspect.

According to a thirteenth aspect, an embodiment of this application provides a chip. The chip is connected to a memory, and is configured to read and execute a software program stored in the memory, to implement the method according to any one of the possible designs of the eighth aspect.

DESCRIPTION OF EMBODIMENTS

The following further describes in detail this application with reference to accompanying drawings.

Figure 1:
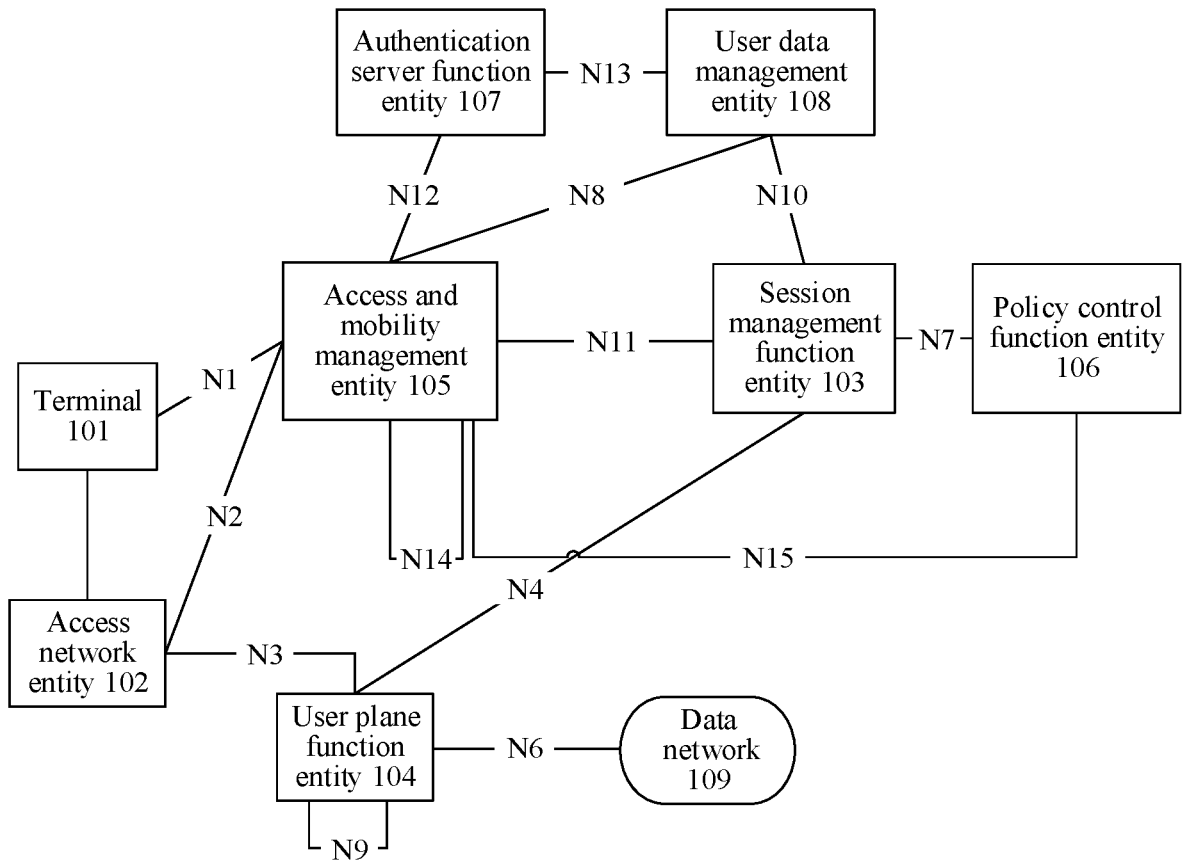
FIG. 1 is a schematic architectural diagram of a system applicable to an embodiment of this application.

FIG. 1 exemplifies a schematic architectural diagram of a system applicable to an embodiment of this application. As shown in FIG. 1, in a future 5G system architecture, a terminal 101 may communicate with a core network through an access network entity 102. A terminal may be referred to as user equipment (UE), an access terminal, a subscriber unit, a subscriber station, a mobile station, a mobile, a remote station, a remote terminal, a mobile device, a user terminal, a terminal, a wireless communications device, a user agent, or a user apparatus. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, an in-vehicle device, a wearable device, or a terminal device in a future 5G network. For convenience of description, FIG. 1 only shows one terminal. In an actual network, a plurality of terminals may coexist. Details are not described herein again.

For the access network (AN) entity 102, an access network entity may also be referred to as a radio access network (RAN) entity, hereinafter is collectively referred to as the access network entity or the RAN entity below, and is mainly responsible for providing a wireless connection for the terminal 101, thereby ensuring reliable transmission of uplink and downlink data of the terminal 101. The access network entity 102 may be a gNB (generation Node B) in the 5G system, or may be a base transceiver station (BTS) in a global system for mobile communications (GSM) or in code division multiple access (CDMA), a base station (NodeB, NB) in a wideband code division multiple access (WCDMA) system, or an evolved NodeB (Evolutional Node B, eNB, or eNodeB) in a Long Term Evolution (LTE) system, or the like.

For a session management function (SMF) entity 103, the entity may be configured to implement some functions of a mobility management entity (MME) in an LTE system, and is mainly responsible for establishing a session and managing a session for the terminal 101. A suitable user plane function (UPF) entity may be selected for the terminal 101 based on location information of the terminal 101.

A user plane function entity 104 is a functional network element of the user plane of the terminal 101, and main functions of the user plane function entity 104 include packet routing and forwarding, quality of service (QoS) processing of user plane data, and the like.

Main functions of an access and mobility management function (AMF) entity 105 include a termination point of a radio access network control plane, a termination point of non-access signaling, mobility management, lawful interception, access authorization or authentication, and the like.

A policy control function (PCF) entity 106 is mainly responsible for functions such as establishing, releasing, and modifying a transmission path of a user plane.

Main functions of an authentication server function (AUSF) entity 107 include user authentication and the like.

A user data management (UDM) entity 108 is mainly responsible for managing subscription data of a user.

A data network (DN) 109 may be a network providing services for the terminal 101. For example, some DNs may provide an Internet access function for the terminal 101, and some DNs may provide a multimedia messaging service function for the terminal 101.

A PDU session is a connection between the terminal and the DN, and provides a PDU connectivity service. A terminal may establish a plurality of PDU sessions to connect to a same DN or different DNs. The terminal may alternatively establish a PDU session for which different UPFs provide services, to connect to the same DN.

States of the PDU session at least include an active state and inactive (or de-activated) state.

An active state is a state in which a user plane resource of the PDU session has been established. An end-to-end connection is established between the terminal and the DN, and data can be transferred through the PDU session. An inactive state means that only some user plane resources are reserved for the PDU session. However, neither a user plane air interface resource between the terminal and the RAN entity nor a connection between the RAN entity and the UPF entity is established. Data cannot be transferred between the terminal and the DN, but some information of the PDU session is still reserved in the SMF entity and the UPF entity.

A PDU session establishment procedure is generally divided into three parts: First part: a preparation procedure of the user plane resource of the PDU session; Second part: an establishment of the air interface resource of the PDU session; and Third part: a subsequent procedure of the PDU session, for example, a procedure in which after establishment of the PDU session is completed, the RAN entity sends a port number of the RAN entity to the UPF entity, thereby completing acknowledgement of the established PDU session.

The embodiments of this application mainly relate to the second part, that is, establishment of the air interface resource of the PDU session. Detailed descriptions are provided below.

FIG. 1 also shows possible implementations of interfaces in respective entities, for example, an N2 interface between the access network entity 102 and the AMF entity 109, and an N9 interface between the access network entity 102 and the UPF entity 104. Details are not described herein again.

Figure 2:
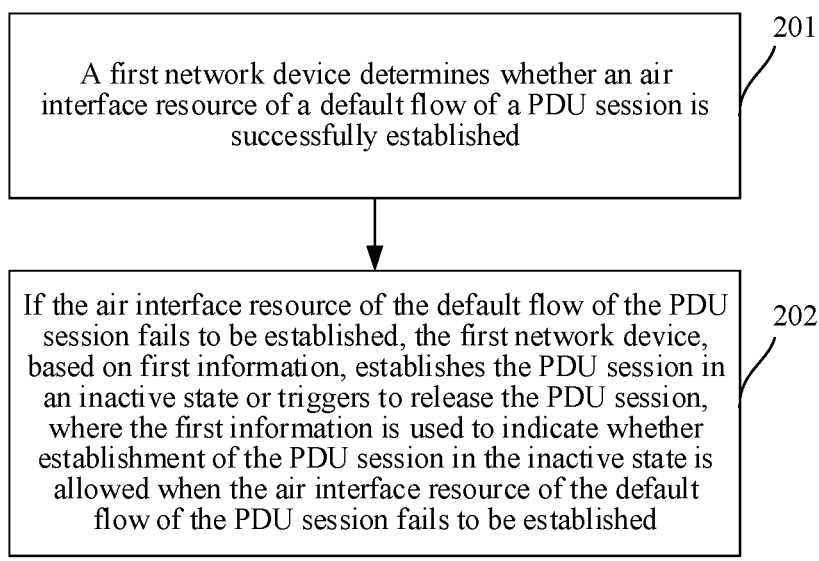
FIG. 2 is a schematic flowchart of a session establishment method according to an embodiment of this application.

With reference to the foregoing descriptions, FIG. 2 is a schematic flowchart of a session establishment method according to an embodiment of this application. In the method shown in FIG. 2, a first network device may be an SMF entity, and a second network device may be an RAN entity.

Referring to FIG. 2, the method includes the following steps.

Step 201. The first network device determines whether an air interface resource of a default flow of a PDU session is successfully established.

It should be noted that the PDU session may be a newly initiated-to-be-established PDU session, or may be a session that is in an inactive state. When the PDU session is the PDU session in an inactive state, the terminal needs to activate the PDU session in the inactive state by using service request information.

Step 202. If the air interface resource of the default flow of the PDU session fails to be established, the first network device, based on first information, establishes the PDU session in an inactive state or triggers to release the PDU session, where the first information is used to indicate whether establishment of the PDU session in the inactive state is allowed when the air interface resource of the default flow of the PDU session fails to be established.

In this embodiment of this application, when the PDU session is the newly initiated-to-be-established PDU session, establishing, based on the first information, the PDU session in the inactive state may be establishing the newly initiated-to-be-established PDU session to be in the inactive state. When the PDU session is a session in an inactive state, establishing, based on the first information, the PDU session in the inactive state may be establishing the PDU session in the inactive state to maintain the inactive state.

Before step 202, the first network device may obtain the first information from a UDM entity or a PCF entity.

In this embodiment of this application, the first information is used to indicate whether establishment of the PDU session in the inactive state is allowed when the air interface resource of the default flow of the PDU session fails to be established.

The first information may have various forms. In a possible implementation, the first information may be a slice/service type (SST) in subscription data of the terminal corresponding to the PDU session.

When the first information is the slice/service type in the subscription data of the terminal corresponding to the PDU session, the first information may indicate whether the PDU session requested by the terminal can be established to be in the inactive state. For example, when the SST of a slice to which the PDU session belongs is the massive Internet of Things (massive IoT, MIoT), the first information indicates that establishing the PDU session to be in the inactive state is allowed; and when the SST of the slice to which the PDU session belongs is an IP multimedia subsystem (IMS) type, the first information indicates that establishing the PDU session to be in the inactive state is not allowed.

In a possible implementation, the first information may be a policy and charging control (PCC) rule of the terminal corresponding to the PDU session. Correspondingly, when the first information is the PCC rule obtained from the PCF entity, the PCC rule may indicate that establishing the PDU session to be in the inactive state is not allowed when the slice/service type (SST) of the slice to which the PDU session belongs is ultra-reliable low latency communications (URLLC); when the SST of the slice to which the PDU session belongs is the massive internet of things (massive IoT, MIoT), the first information indicates that establishing the PDU session to be in the inactive state is allowed; and when the SST of the slice to which the PDU session belongs is an IP multimedia subsystem (IMS) type, the first information indicates that establishing the PDU session to be in the inactive state is not allowed.

In a possible implementation, the first information may alternatively be indication information sent by the terminal to the first network device. Before establishing the PDU session, the terminal generates the first information and sends the first information to the first network device through the second network device, so that the terminal can indicate, by using the first information, whether the PDU session can be established to be in the inactive state.

When the first information is sent by the terminal to the first network device, the terminal first sends the first information to the second network device, and the second network device then forwards the first information to the first network device. In this case, the first information may be in a PDU session establishment request or a PDU session user plane resource establishment request sent by the terminal to the second network device, or may be in a service request or a handover request sent to the second network device. This is not limited in this embodiment of this application. The terminal may determine, based on an actual condition, a message that carries the first information.

In this embodiment of this application, the first information may also be a local policy configured by the first network device. For example, the local policy may be: when the SST of the slice to which the PDU session belongs is the URLLC, it may indicate that establishing the PDU session to be in the inactive state is not allowed; when the SST of the slice to which the PDU session belongs is the MIoT, it may indicate that establishing the PDU session to be in the inactive state is allowed; and when the SST of the slice to which the PDU session belongs is the IMS type, it may indicate that establishing the PDU session to be in the inactive state is not allowed.

It should be noted that, the first information may alternatively be in another form. Details are not described herein again.

After the first network device obtains the first information, the terminal may trigger the procedure of establishing the PDU session, or a network side actively establishes the PDU session for the terminal. In this case, a preparation procedure of the user plane resource of the PDU session needs to be triggered. Specific content of the procedure is not limited in this embodiment of this application, and details are not described herein again.

After the preparation procedure of the user plane resource of the PDU session, the air interface resource of the PDU session needs to be established. The user plane resource of the PDU session may be divided into two parts, that is, the air interface resource between the terminal and the RAN entity, and a network side resource between the RAN entity and the DN.

The second network device separately establishes an air interface resource for each flow in the PDU session based on a parameter, such as a QoS profile, required by each flow in the PDU session. One PDU session includes at least one flow, in which one flow is a default flow. The default flow is a flow processed by using a default QoS rule. The default QoS rule is the only QoS rule in the PDU session that may not include a packet filter. If the air interface resource of the default flow of the PDU session fails to be established, it represents that the PDU session fails to be established. If the air interface resource of the default flow of the PDU session is successfully established, even though other air interface resources included in the PDU session fail to be established, the PDU session may also be considered as successfully established.

The RAN entity may establish corresponding air interface resource for each flow in the PDU session, to establish the user plane resource for the PDU session. The process of establishing the air interface resource for each flow may succeed or fail. If the process of establishing the air interface resource for a specific flow fails, the flow cannot transfer the data.

In the process of establishing the user plane resource for the PDU session, the second network device may feed back a result of a success or a failure of establishing the air interface resource for each flow to the network side, that is, send the flow list to the first network device. A flow included in the flow list is the flow of which the air interface resource fails to be established when the second network device establishes the air interface resource for the flow in the PDU session. The flow list may also be referred to as a list of rejected QoS flows, or be referred to as a list of rejected QoS flows for the PDU sessions activated.

In step 201, the first network device may first obtain the flow list and determine, based on the flow list, whether the air interface resource of the default flow of the PDU session is successfully established. The flow list is generated by the second network device based on an establishment result of the air interface resource of the PDU session, and the flow list includes the flow of which the air interface resource in the PDU session fails to be established.

The flow list obtained by the first network device is sent by the second network device to the first network device through entities such an AMF entity.

For example, the second network device sends an N2 message that includes N2 session management (SM) information to the AMF entity. The N2 session management information includes information such as a PDU session identifier, AN tunnel information, a list of accepted QoS flows for the PDU sessions activated, and the flow list. The N2 message may also include one or more of the following: the PDU session identifier, an establishment failure reason, the N2 session management (SM) information, and the like.

The AMF entity further sends an N11 message that includes the N2 session management information to the first network device. After receiving the N11 message, the first network device may obtain the flow list.

For another example, in a home routed scenario, the terminal roams from a home-public land mobile network (H-PLMN) to a visited-public land mobile network (Visited-PLMN, V-PLMN). The terminal is changed from being served by the first network device to being served by a third network device, and the third network device and the first network device are both SMF entities. In this scenario, the second network device sends the N2 message that includes the flow list to the AMF entity. The AMF entity then sends the N11 message that includes the flow list to the third network device. Moreover, the third network device sends an N16 message that includes the flow list to the first network device. After receiving the N16 message, the first network device can obtain the flow list.

After obtaining the flow list, the first network device can determine whether the air interface resource of each flow in the PDU session is successfully established.

In step 202, if the first network device determines that the default flow of the PDU session is not in the flow list, it can be considered that the PDU session is successfully established, and subsequent procedures are performed.

Correspondingly, if the first network device determines that the default flow of the PDU session is in the flow list, it can be considered that the air interface resource of the default flow of the PDU session fails to be established. In this case, the first network device can establish the PDU session in the inactive state or trigger to release the PDU session.

Specifically, the first network device may, based on the first information, determine whether establishment of the PDU session in the inactive state is allowed or to trigger to release the PDU session. If determining, based on the first information, that establishment of the PDU session in the inactive state is allowed, the first network device can establish the PDU session in the inactive state; correspondingly, if determining, based on the first information, that establishment of the PDU session in the inactive state is not allowed, the first network device triggers to release the PDU session.

Optionally, when establishing the PDU session in the inactive state, the first network device can release the air interface resource of the flow that is in the PDU session and of which the air interface resource is successfully established, thereby preventing the PDU session in the inactive state from occupying excessive resources.

The first network device may specifically establish the PDU session in the inactive state through the following steps:

Step 1. The first network device sends an Internet Protocol-connectivity access network (IP-CAN) session modification message to the PCF entity, where the message is used to indicate that the PDU session is established to be in the inactive state.

Step 2. The first network device sends an N4 session update request message to a UPF entity, where the request message is used to indicate that the PDU session is established to be in the inactive state.

Correspondingly, the first network device receives an N4 session update response message sent by the UPF entity.

Step 3. The first network device sends an N11 message response to the AMF entity, where the N11 message response is used to indicate that the PDU session is established to be in the inactive state, and the message includes an SM non-access stratum (NAS) message.

Step 4. The AMF entity sends an N2 message response to the second network device, where the N2 message response is used to indicate that the PDU session is established to be in the inactive state and the message includes the SM non-access stratum (NAS) message.

Step 5. The second network device transparently transmits the SM NAS message in the N2 message response to the terminal, where the SM NAS message is used to indicate that the PDU session is established to be in the inactive state, and the terminal synchronizes a state of the PDU session based on the message.

Optionally, the second network device may alternatively send second information to the first network device, where the second information is used to indicate a time point at which the PDU session in the inactive state is activated. The second information and the flow list may be sent to the first network device in the same message.

Correspondingly, after obtaining the second information, the first network device activates the PDU session in the inactive state at the time point indicated by the second information. The second information can indicate timing duration of a timer. After receiving the second information, the first network device sets the timer based on the timing duration indicated by the second information and activates the PDU session in the inactive state when the timer expires.

Optionally, the first network device may alternatively send the second indication information to the terminal through the second network device, so that the terminal can send an activation request message to the second network device at the time point indicated by the second indication information, where the activation request message is used to request to activate the PDU session in the inactive state. The activation request message may be a service request or the like. This is not limited in this embodiment of this application.

Further, the subscription data or the PCC rule may further include third information. While obtaining the first information, the first network device may further obtain the third information, where the third information is used to indicate a maximum quantity of times for which the PDU session in the inactive state is activated.

After determining that the default flow of the PDU session is in the flow list and establishing the PDU session in the inactive state, the first network device may reactivate the PDU session in the inactive state. After obtaining the third information, if determining that a quantity of times for which the PDU session in the inactive state is activated is equal to the maximum quantity of times, instead of activating the PDU session in the inactive state, the first network device triggers to release the PDU session.

In this embodiment of this application, if determining, based on the first information, that establishment of the PDU session in the inactive state is not allowed, the first network device can perform any one of the following procedures.

Procedure 1: When determining that at least one flow of which an air interface resource is successfully established exists in at least one flow included in the PDU session, the first network device triggers to establish the user plane resource for the PDU session. In this case, although the default flow of the PDU session is not successfully established, a flow of which the air interface resource is successfully established exists in the PDU session, so that data can be transferred through the flow of which the air interface resource is successfully established.

Procedure 2. The first network device sends a quality of service parameter of the default flow to the second network device, and instructs the second network device to establish an air interface resource for the default flow based on the quality of service parameter of the default flow.

The quality of service parameter of the default flow sent by the first network device is obtained by the PCF entity. Specifically, after the air interface resource of the default flow fails to be established, the first network device notifies the PCF entity that the air interface resource of the default flow fails to be established. In this case, the PCF entity re-adjusts the quality of service parameter of the default flow, and sends the adjusted quality of service parameter of the default flow to the first network device. The first network device forwards the obtained quality of service parameter of the default flow to the AMF entity, and the AMF entity forwards the quality of service parameter of the default flow to the second network device. The second network device re-establishes the air interface resource for the default flow based on the quality of service parameter of the default flow.

The reason why the air interface resource of the default flow is not successfully established may be that quality of service corresponding to the quality of service parameter used by the second network device for establishing the default flow is relatively high, so that the second network device cannot allocate an air interface resource satisfying requirements. Another reason may be that an operating fault, that is, an Error Case, of the second network device results in that the second network device cannot allocate an air interface resource. Certainly, there may be another reason why the air interface resource of the default flow is not successfully established. Examples are not provided herein one by one for description. The quality of service corresponding to the quality of service parameter sent by the first network device is lower than the quality of service corresponding to the quality of service parameter used by the second network device for establishing the default flow, so that based on the quality of service parameter of the default flow sent by the first network device, the second network device has a higher probability of establishing the air interface resource for the default flow, so that a PDU session can be established.

Procedure 3: The first network device triggers a procedure of releasing the PDU session.

Further, in the procedure, the first network device may further release the air interface resource of the flow that is in the PDU session and of which the air interface resource is successfully established, thereby improving utilization of the air interface resource.

It should be noted that the second network device may also notify the first network device to specifically perform one of the foregoing procedure 1 to procedure 3, and may also determine the procedure required to be performed by other manners. This is not limited in this embodiment of this application.

The foregoing processes are provided below with reference to specific embodiments.

Figure 3:
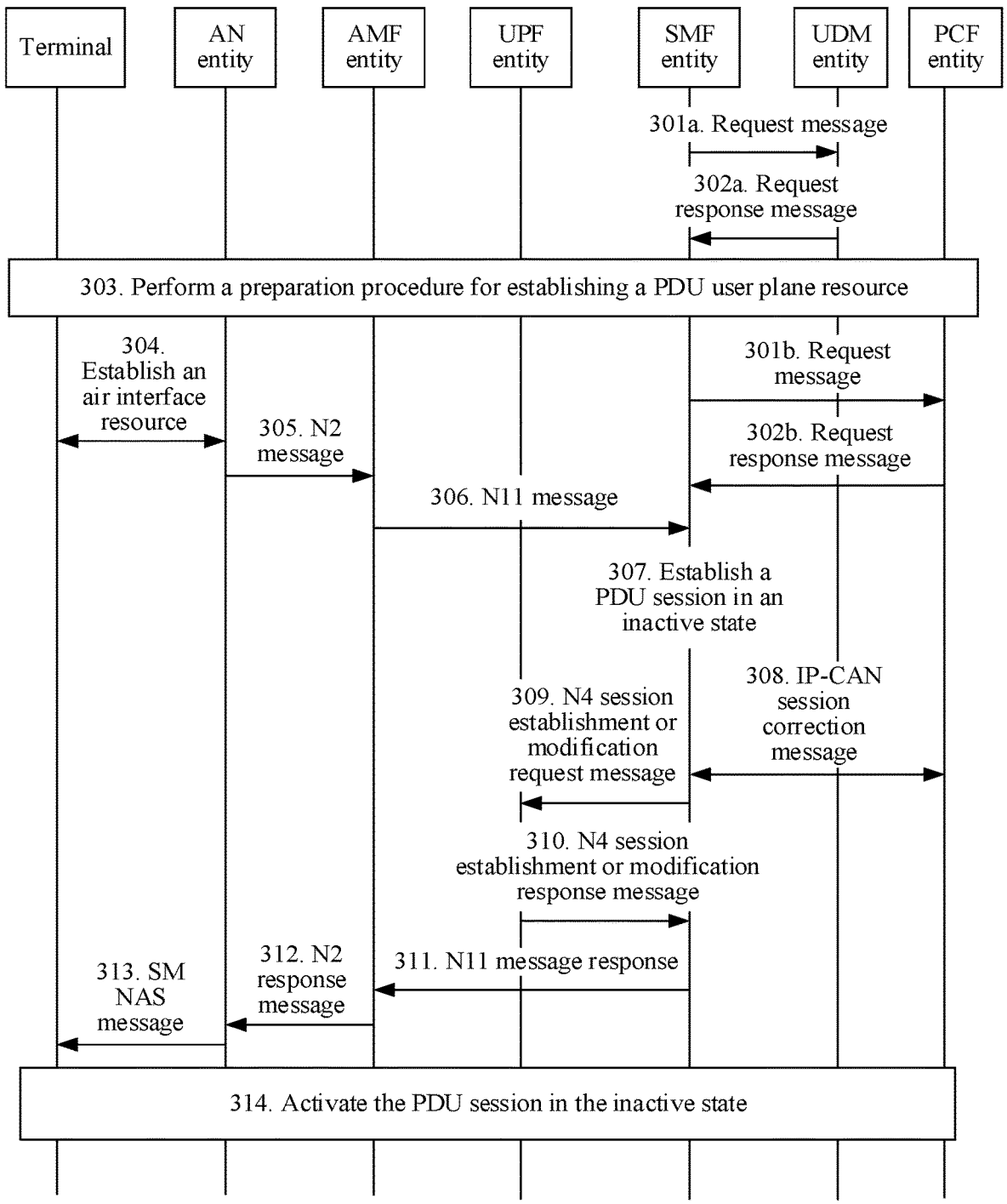
FIG. 3 is a schematic flowchart of establishing a PDU session user plane according to an embodiment of this application.

FIG. 3 is a schematic flowchart of establishing a PDU session user plane according to an embodiment of this application.

In procedures shown in FIG. 3, a first network device is an SMF entity, and a second network device is an RAN entity.

Step 301a: The SMF entity sends a request message to a UDM entity, where the request message is used to request for subscription data of a terminal.

The subscription data includes first information.

Optionally, the subscription data further includes third information.

Step 302a: The UDM entity sends a request response message to the SMF entity, where the request response message includes the subscription data or a PCC rule.

Optionally, step 301a and step 302a may alternatively be replaced with step 301b and step 302b.

Step 301b. The SMF entity sends a request message to a PCF entity, where the request message is used to request for a PCC rule.

The PCC rule includes first information.

Optionally, the PCC rule further includes third information.

Step 302b. The PCF entity sends a request response message to the SMF entity, where the request response message includes the PCC rule.

Step 303. Perform a preparation procedure for establishing a PDU user plane resource.

A specific process of the step is not limited in this embodiment of this application. Details are not described herein again.

Step 304. An RAN entity establishes an air interface resource for each flow included in a PDU session.

A specific process of how to establish the air interface resource is not limited in this embodiment of this application. Details are not described herein again.

Step 305. The RAN entity generates a flow list based on an establishment result of the air interface resource of each flow in the PDU session and sends an N2 message that includes N2 session management information to an AMF entity. The N2 session management information includes the flow list, where the flow list includes a flow that is in the PDU session and of which an air interface resource fails to be established.

Optionally, the N2 message further includes second information.

The N2 message may further includes one or more of the following: a PDU session identifier and an establishment failure reason.

Step 306. The AMF entity sends an N11 message that includes the N2 session management information to the SMF entity.

Step 307. If determining that a default flow of the PDU session is in the flow list, and determining, based on the first information, that establishing the PDU session to be in an inactive state is allowed, the SMF entity triggers to establish the PDU session in the inactive state.

Step 308. The SMF entity sends an IP-CAN session correction message to the PCF entity, where the message is used to indicate that the PDU session is established to be in the inactive state. If the PCF entity has a policy related to the PDU session in the inactive state, the PCF entity sends the related policy to the SMF entity.

Step 309. The SMF entity sends an N4 session establishment/modification request (N4 Session establishment/modification request) message to a UPF entity. If the request message is an N4 session establishment request message, the SMF entity instructs the UPF entity to buffer downlink data, sends a downlink data notification (DDN) message, and does not send a port number of the RAN entity to the UPF entity. If the request message is an N4 session modification request message, the SMF entity may update a parameter on the UPF entity based on requirements.

The request message is used to indicate that the PDU session is established to be in an inactivate state.

Step 310. The SMF entity receives an N4 session update response message sent by the UPF entity.

Step 311. The SMF entity sends an N11 message response to the AMF entity. The N11 message response is used to indicate that the PDU session is established to be in the inactive state, where the message includes an SM non-access stratum message. The N11 message response may further include the first information. If the AMF entity maintains the state of the PDU session, the AMF entity can mark the PDU session with the inactive state based on the first information.

Step 312. The AMF entity sends an N2 message response to the RAN entity. The N2 message response is used to indicate that the PDU session is established to be in the inactive state, where the message includes the SM non-access stratum (NAS) message.

Step 313. After receiving the N2 message response, the RAN entity deletes a resource related to the PDU session. Moreover, the RAN entity transparently transmits an SM NAS message in the N2 message response to the terminal, where the SM NAS message is used to indicate that the PDU session is established to be in the inactive state, and the terminal synchronizes a state of the PDU session based on the message.

Optionally, when the N2 message includes the second information, step 314: The SMF entity activates the PDU session in the inactive state at a time point indicated by the second information. The SMF entity can also send the second information to the terminal, and the terminal sets a timer based on the second information, so that the terminal activates the PDU session in the inactive state at the time point indicated by the second information.

Optionally, when the subscription data or the PCC rule includes the third information, if determining that a quantity of times for which the PDU session in the inactive state is activated is equal to the maximum quantity of times indicated by the third information, instead of activating the PDU session in the inactive state, the SMF entity triggers to release the PDU session.

A specific process of how the SMF entity activates the PDU session in the inactive state is not limited in this embodiment of this application. Details are not described herein again.

In the foregoing procedure, after obtaining the flow list, if determining that the default flow of the PDU session is in the flow list, the SMF entity can establish the PDU session in the inactive state, and can re-establish the air interface resource for the PDU session at a suitable time. Compared with re-establishing the PDU session, activating the PDU session in the inactive state can save time and signaling, so that the PDU session user plane resource can be established faster, thereby improving system efficiency.

Figure 4:
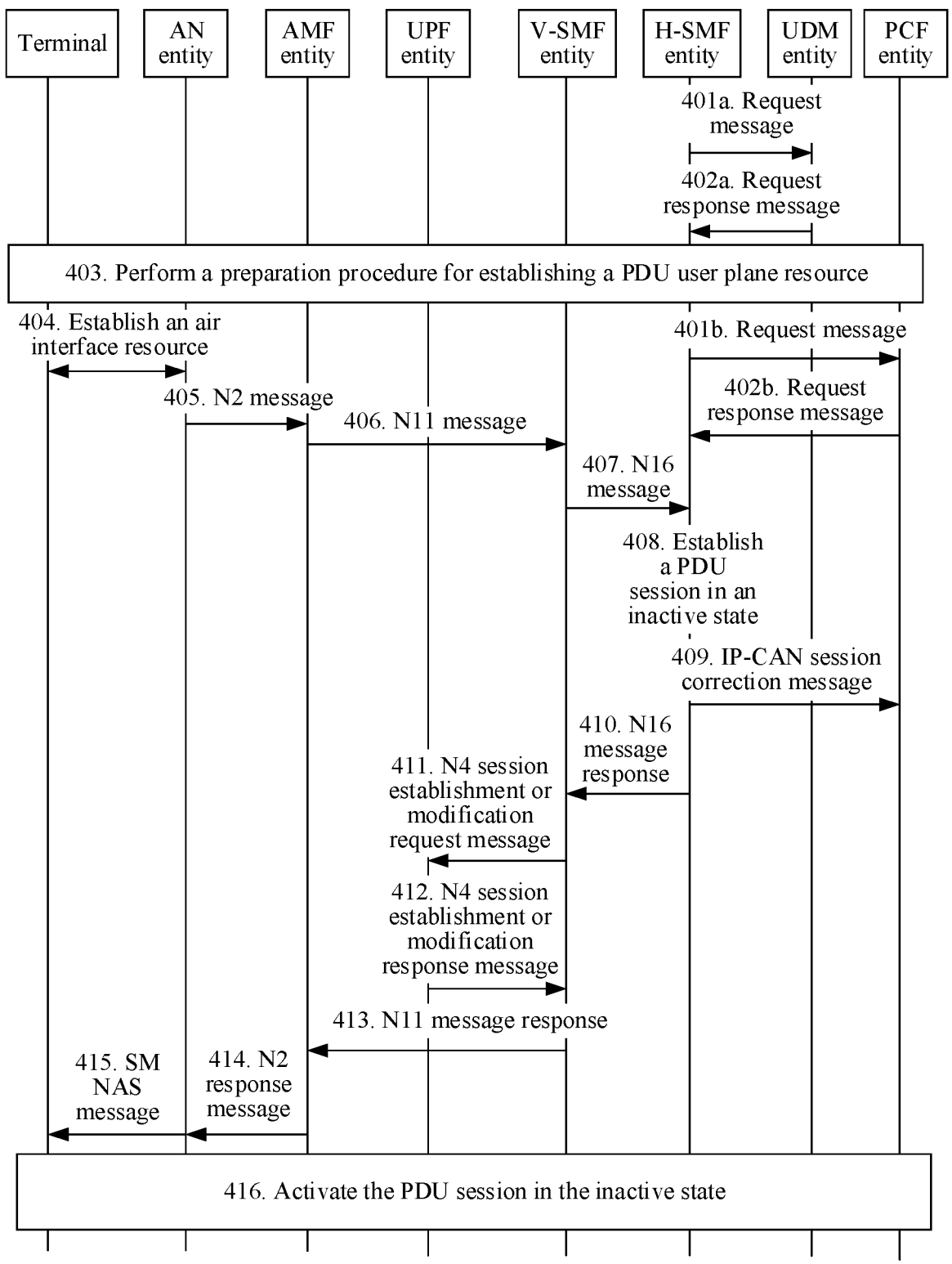
FIG. 4 is a schematic flowchart of establishing a PDU session user plane according to an embodiment of this application.

FIG. 4 is a schematic flowchart of establishing a PDU session user plane according to an embodiment of this application.

The procedure of FIG. 4 is in a home routed scenario. A terminal roams from a first network device that is in an H-PLMN to a third network device that is in a V-PLMN. The third network device and the first network device are both SMF entities. For convenience of description, the first network device is referred to as an H-SMF entity, the third network device is referred to as a V-SMF entity, and a second network device is referred to as an RAN entity.

Step 401a: The H-SMF entity sends a request message to a UDM entity, where the request message is used to request for subscription data of a terminal.

The subscription data includes first information.

Step 402a: The UDM entity or a PCF entity sends a request response message to the SMF entity, where the request response message includes subscription data or a PCC rule.

Optionally, step 401a and step 402a may alternatively be replaced with step 401b and step 402b.

Step 401b. The H-SMF entity sends a request message to a PCF entity, where the request message is used to request for a PCC rule.

The PCC includes first information.

Step 402b. The PCF entity sends a request response message to the H-SMF entity, where the request response message includes the PCC rule.

Step 403. Perform a preparation procedure for establishing a PDU user plane resource.

A specific process of the step is not limited in this embodiment of this application. Details are not described herein again.

Step 404. An RAN entity establishes an air interface resource for each flow included in a PDU session.

Step 405. The RAN entity generates a flow list based on an establishment result of the air interface resource of each flow in the PDU session and sends an N2 message that includes N2 session management information to an AMF entity. The N2 session management information includes the flow list, where the flow list includes a flow that is in the PDU session and of which an air interface resource fails to be established.

Optionally, the N2 message further includes second information.

The N2 message may further includes one or more of the following: a PDU session identifier and an establishment failure reason.

Step 406. The AMF entity sends an N11 message that includes the N2 session management information to the V-SMF entity.

Step 407. The V-SMF entity sends an N16 message that includes the N2 session management information to the H-SMF entity.

Step 408. If determining that a default flow of the PDU session is in the flow list, and determining, based on the first information, that establishing the PDU session to be in an inactive state is allowed, the H-SMF entity triggers to establish the PDU session in the inactive state.

Step 409. The H-SMF entity sends an IP-CAN session correction message to the PCF entity, where the message is used to indicate that the PDU session is established to be in the inactive state. If the PCF entity has a policy related to the PDU session in the inactive state, the PCF entity sends the related policy to the H-SMF entity.

Step 410. The H-SMF entity sends an N16 message response to the V-SMF entity, where the N16 message response is used to indicate that the PDU session is established to be in the inactive state.

Step 411. The V-SMF entity sends an N4 session establishment or modification request message to a UPF entity, where the request message is used to indicate that the PDU session is established to be in the inactive state. If the request message is an N4 session establishment request message, the SMF entity instructs the UPF entity to buffer downlink data, sends a downlink data notification message, and does not send a port number of the (R)AN entity to the UPF entity. If the request message is an N4 session modification request message, the SMF entity may update a parameter on the UPF entity based on requirements.

Step 412. The V-SMF entity receives an N4 session update response message sent by the UPF entity.

Step 413. The V-SMF entity sends an N11 message response to the AMF entity. The N11 message response is used to indicate that the PDU session is established to be in the inactive state, where the message includes an SM non-access stratum message.

Step 414. The AMF entity sends an N2 message response to the RAN entity. The N2 message response is used to indicate that the PDU session is established to be in the inactive state, where the message includes the SM non-access stratum (NAS) message.

Step 415. After receiving the N2 message response, the RAN entity deletes a resource related to the PDU session. Moreover, the RAN entity transparently transmits an SM NAS message in the N2 message response to the terminal, where the SM NAS message is used to indicate that the PDU session is established to be in the inactive state, and the terminal synchronizes a state of the PDU session based on the message.

Optionally, when the N2 message includes the second information, step 416: The H-SMF entity activates the PDU session in the inactive state at a time point indicated by the second information.

Optionally, when the subscription data or the PCC rule includes third information, if determining that a quantity of times for which the PDU session in the inactive state is activated is equal to the maximum quantity of times indicated by the third information, instead of activating the PDU session in the inactive state, the H-SMF entity triggers to release the PDU session.

A specific process of how the SMF entity activates the PDU session in the inactive state is not limited in this embodiment of this application. Details are not described herein again.

In the foregoing procedure, after obtaining the flow list, if determining that the default flow of the PDU session is in the flow list, the SMF entity can establish the PDU session in the inactive state, and can re-establish the air interface resource for the PDU session at a suitable time. Compared with re-establishing the PDU session, activating the PDU session in the inactive state can save time and signaling, so that the PDU session user plane resource can be established faster, thereby improving system efficiency.

Figure 5:
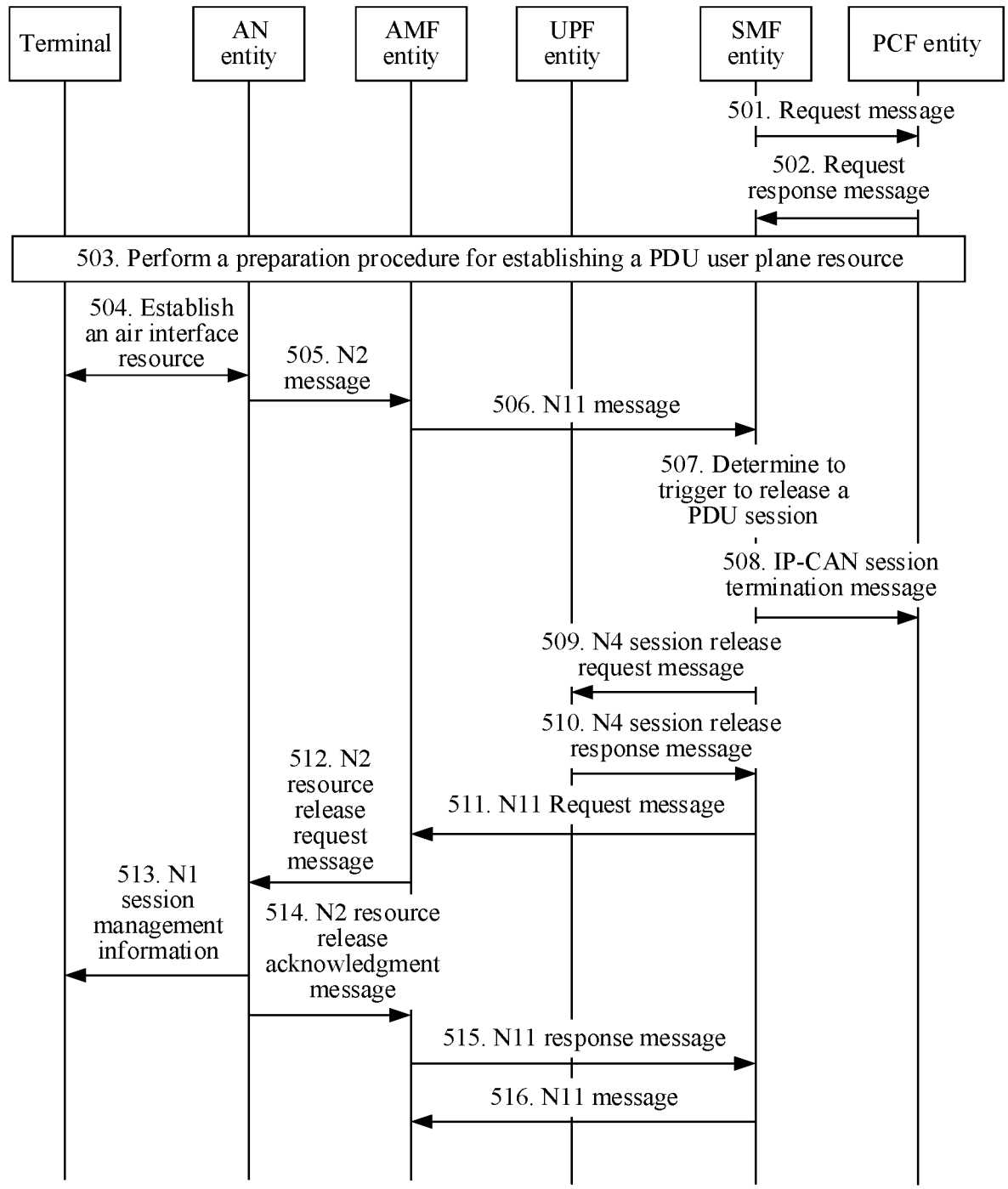
FIG. 5 is a schematic flowchart of releasing a PDU session according to an embodiment of this application.

FIG. 5 is a schematic flowchart of releasing a PDU session according to an embodiment of this application.

In procedures shown in FIG. 5, a first network device is an SMF entity, and a second network device is an RAN entity.

Step 501. The SMF entity sends a request message to a PCF entity, where the request message is used to request for a PCC rule.

The PCC includes first information.

Step 502. The PCF entity sends a request response message to the SMF entity, where the request response message includes the PCC rule.

Certainly, the SMF entity may alternatively request the UDM entity for subscription data of a terminal, to obtain the first information. For details, refer to the foregoing description. Details are not described herein again.

Step 503. Perform a preparation procedure for establishing a PDU user plane resource.

A specific process of the step is not limited in this embodiment of this application. Details are not described herein again.

Step 504. The RAN entity establishes an air interface resource for each flow included in the PDU session.

A specific process of how to establish the air interface resource is not limited in this embodiment of this application. Details are not described herein again.

Step 505. The RAN entity generates a flow list based on an establishment result of the air interface resource of each flow in the PDU session and sends an N2 message that includes N2 session management information to an AMF entity. The N2 session management information includes the flow list, where the flow list includes a flow that is in the PDU session and of which an air interface resource fails to be established.

Step 506. The AMF entity sends an N11 message that includes the N2 session management information to the SMF entity.

Step 507. If determining that a default flow of the PDU session is in the flow list, and determining, based on the first information, that establishment of the PDU session in the inactive state is not allowed, the SMF entity triggers to release the PDU session.

The SMF entity may further send timing indication information to the terminal, where the timing indication information is used to instruct the terminal to initiate re-establishment of the PDU session after preset timing duration.

The timing indication information may be in subscription data or the PCC rule of the terminal, or may be sent to the SMF entity by the RAN entity.

Further, the SMF entity may further release the air interface resource of the flow that is in the PDU session and of which the air interface resource is successfully established, thereby improving utilization of the air interface resource.

Step 508. The SMF entity sends an IP-CAN session termination message to the PCF entity, where the message is used to instruct to release the PDU session.

Step 509. The SMF entity sends an N4 session release request message to the UPF entity, where the N4 session release request message is used to instruct to delete an IP address/prefix allocated to the PDU session and release the user plane resource of the PDU session.

Step 510. The SMF entity receives the N4 session release response message sent by the UPF entity.

Step 511. The SMF entity sends an N11 request message to the AMF entity, where the N11 request message includes N1 session management information, and the N1 session management information includes a PDU session release command and the timing indication information.

Step 512. The AMF entity sends an N2 resource release request message to the (R)AN entity, where the N2 resource release request message includes N1 session management information.

Step 513. The RAN entity transparently transmits the N1 session management information to the terminal, and releases the user plane resource of the PDU session.

Step 514. The RAN entity sends an N2 resource release acknowledgment message to the AMF entity, where the message is used to indicate that the user plane resource of the PDU session has been released.

Step 515. The AMF entity sends an N11 response message to the SMF entity, where the N11 response message includes the N2 resource release acknowledgment message.

Step 516. The SMF entity sends an N11 message to the AMF entity, where the message is used to notify the AMF entity that the PDU session has been released.

It should be noted that, in step 507, if determining that the default flow of the PDU session is in the flow list and determining, based on the first information, that establishment of the PDU session in the inactive state is not allowed, the SMF entity triggers to establish the user plane resource for the PDU session when determining that at least one flow of which an air interface resource is successfully established exists in at least one flow included in the PDU session. In this case, although the default flow of the PDU session is not successfully established, a flow of which the air interface resource is successfully established exists in the PDU session, so that data can be transferred through the flow of which the air interface resource is successfully established.

Alternatively, if determining that the default flow of the PDU session is in the flow list, and determining, based on the first information, that establishment of the PDU session in the inactive state is not allowed, the SMF entity notifies the PCF entity that the air interface resource of the default flow fails to be established and receives a quality of service parameter of the default flow sent by the PCF entity. The SMF entity forwards the obtained quality of service parameter of the default flow to the AMF entity, and the AMF entity forwards the quality of service parameter of the default flow to the RAN entity, so that the RAN entity re-establishes the air interface resource for the default flow based on the quality of service parameter of the default flow.

In this embodiment of this application, in the process of reactivating the PDU session in the inactive state, it is also possible to maintain the state of the PDU session in the inactive state unchanged or to release the resource of the PDU session in the inactive state when it is determined that the PDU session in the inactive state cannot be activated.

Figure 6:
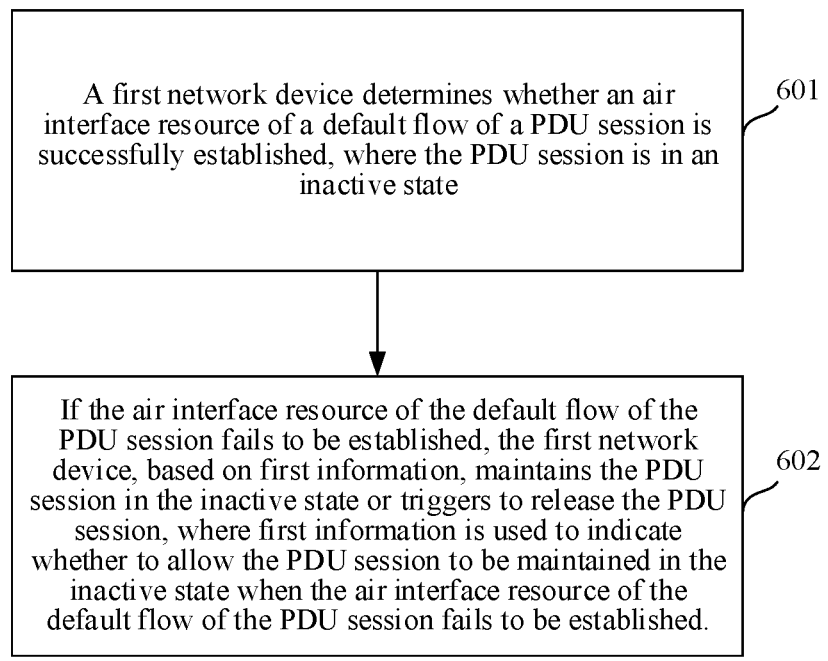
FIG. 6 is a schematic flowchart of a session establishment method according to an embodiment of this application.

With reference to the foregoing descriptions, FIG. 6 is a schematic flowchart of a session establishment method according to an embodiment of this application. A first network device shown in FIG. 6 may be an SMF entity, and a second network device may be an RAN entity.

Referring to FIG. 6, the method includes the following steps:

Step 601. The first network device determines whether an air interface resource of a default flow of a packet data unit PDU session is successfully established, where the PDU session is in an inactive state.

Step 602. If the air interface resource of the default flow of the PDU session fails to be established, the first network device, based on first information, maintains the PDU session in the inactive state or triggers to release the PDU session, where the first information is used to indicate whether to allow the PDU session to be maintained in the inactive state when the air interface resource of the default flow of the PDU session fails to be established.

Other content, such as the first information, in step 601 and step 602 is the same as definitions and descriptions in step 201 and step 202. Details are not described herein again.

In step 601 and step 602, the first network device may further obtain second information or third information. For specific descriptions of the second information and the third information, refer to the definitions or descriptions in step 201 and step 202. Details are not described herein again.

Figure 7:
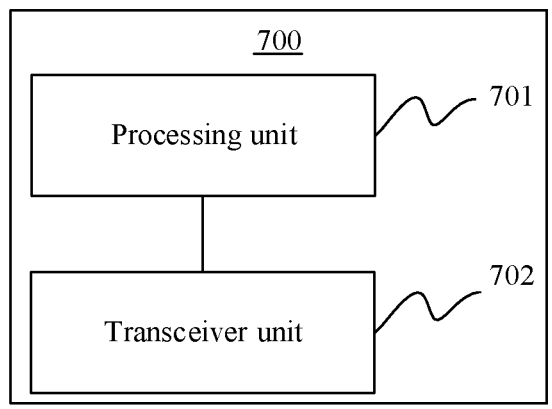
FIG. 7 is a schematic diagram of a session establishment apparatus according to an embodiment of this application.

FIG. 7 is a schematic structural diagram of a session establishment apparatus according to an embodiment of this application. The session establishment apparatus can perform actions of the first network device in the foregoing method embodiments. Optionally, the session establishment apparatus may be an SMF entity, and a second network device may be an RAN entity.

The session establishment apparatus 700 includes a processing unit 701 and a transceiver unit 702.

The processing unit 701 is configured to determine whether an air interface resource of a default flow of a packet data unit PDU session is successfully established.

The transceiver unit 702 is configured to, based on first information, establish the PDU session in an inactive state or trigger to release the PDU session when the air interface resource of the default flow of the PDU session fails to be established, where the first information is used to indicate whether establishment of the PDU session in the inactive state is allowed when the air interface resource of the default flow of the PDU session fails to be established.

In an optional implementation, the transceiver unit 702 is specifically configured to:

obtain a flow list, where the flow list is generated by the second network device based on an establishment result of the air interface resource of the PDU session, and the flow list includes a flow that is in the PDU session and of which an air interface resource fails to be established.

The processing unit 701 is specifically configured to determine, based on the flow list, whether the air interface resource of the default flow of the PDU session is successfully established.

In an optional implementation, the first information is a slice/service type SST in subscription data of a terminal corresponding to the PDU session.

Alternatively, the first information is a policy and charging control rule of the terminal corresponding to the PDU session.

Alternatively, the first information is indication information sent by the terminal to the apparatus.

In an optional implementation, the transceiver unit 702 is further configured to:

obtain second information, where the second information is used to indicate a time point at which the PDU session in the inactive state is activated.

After establishing, based on the first information, the PDU session in the inactive state, the processing unit 701 is further configured to:

activate the PDU session in the inactive state at the time point indicated by the second information.

Alternatively, the transceiver unit is further configured to send the second indication information to the terminal, where the second indication information is used to indicate that the terminal activates the PDU session in the inactive state at the time point.

In an optional implementation, the transceiver unit 702 is further configured to:

obtain third information, where the third information is used to indicate a maximum quantity of times for which the PDU session in the inactive state is activated.

After activating the PDU session in the inactive state at the time point indicated by the second information, the processing unit 701 is further configured to:

trigger a procedure of releasing the PDU session if determining that a quantity of times for which the PDU session in the inactive state is activated is equal to the maximum quantity of times.

In an optional implementation, after determining that the air interface resource of the default flow of the PDU session fails to be established, the processing unit 701 is further configured to:

if determining, based on the first information, that establishment of the PDU session in the inactive state is not allowed, trigger to establish a user plane resource for the PDU session when determining that at least one flow of which an air interface resource is successfully established exists in at least one flow included in the PDU session; or if determining, based on the first information, that establishment of the PDU session in the inactive state is not allowed, send a quality of service parameter of the default flow to the second network device, and instruct the second network device to establish an air interface resource for the default flow based on the quality of service parameter of the default flow.

In an optional implementation, after establishing, based on the first information, the PDU session in the inactive state, the processing unit 701 is further configured to:

release the air interface resource of the flow that is in the PDU session and of which the air interface resource is successfully established.

Figure 8:
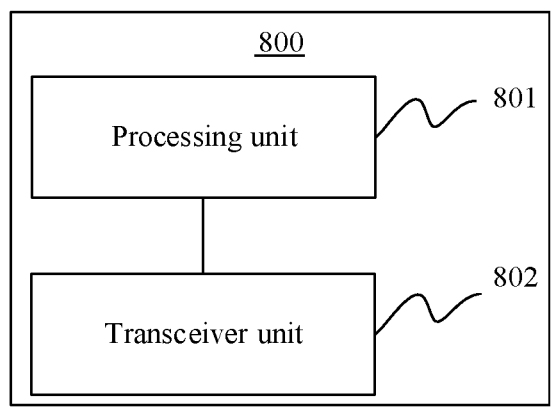
FIG. 8 is a schematic diagram of a session establishment apparatus according to an embodiment of this application.

FIG. 8 is a schematic structural diagram of a session establishment apparatus according to an embodiment of this application. The session establishment apparatus can perform actions of the first network device in the foregoing method embodiments. Optionally, the session establishment apparatus may be an SMF entity, and a second network device may be an RAN entity.

The session establishment apparatus 800 includes a processing unit 801 and a transceiver unit 802.

The processing unit 801 is configured to determine whether an air interface resource of a default flow of a packet data unit PDU session is successfully established, where the PDU session is in an inactive state.

The transceiver unit 802 is configured to, based on first information, maintain the PDU session in the inactive state or trigger to release the PDU session when the air interface resource of the default flow of the PDU session fails to be established, where the first information is used to indicate whether to allow the PDU session to be maintained in the inactive state when the air interface resource of the default flow of the PDU session fails to be established.

Figure 9:
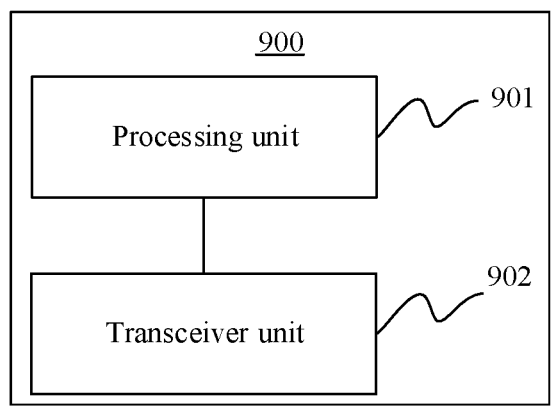
FIG. 9 is a schematic diagram of a session establishment apparatus according to an embodiment of this application.

FIG. 9 is a schematic structural diagram of a session establishment apparatus according to an embodiment of this application. The session establishment apparatus can perform actions of the terminal in the foregoing method embodiments. Optionally, the session establishment apparatus may be an SMF entity, and a second network device may be an (R)AN entity.

The session establishment apparatus 900 includes a processing unit 901 and a transceiver unit 902.

The processing unit 901 is configured to generate first information, where the first information is used to indicate whether establishment of a PDU session in an inactive state is allowed when an air interface resource of a default flow of the packet data unit PDU session fails to be established.

The transceiver unit 902 is configured to send the first information to a first network device through the second network device.

In an optional implementation, the PDU session is established to be in the inactive state.

The transceiver unit 902 is further configured to:

receive second indication information sent by the first network device through the second network device, where the second indication information is used to indicate a time point at which the PDU session in the inactive state is activated; and send an activation request message to the second network device at the time point indicated by the second indication information, where the activation request message is used to request to activate the PDU session in the inactive state.

Figure 10:
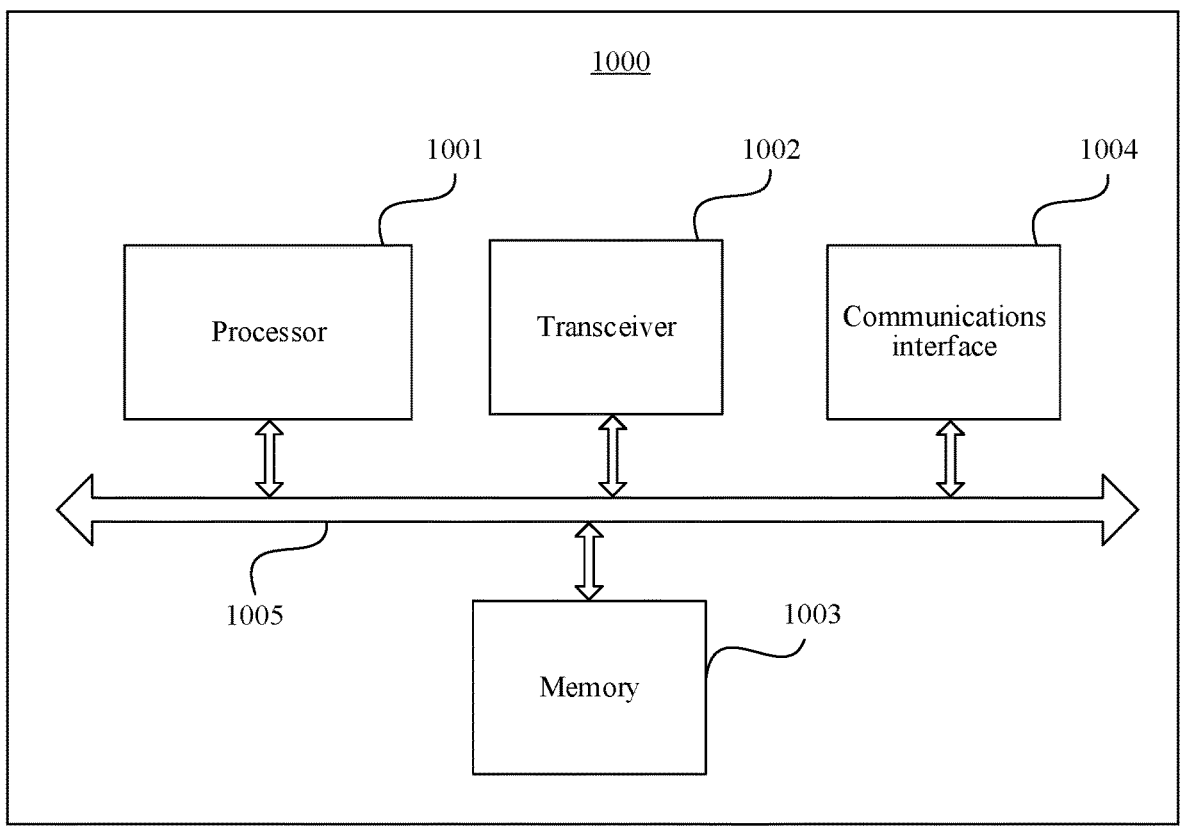
FIG. 10 is a schematic diagram of a session establishment apparatus according to an embodiment of this application.

FIG. 10 is a schematic structural diagram of a session establishment apparatus according to an embodiment of this application. The session establishment apparatus can perform actions of the first network device in the foregoing method embodiments. Optionally, the session establishment apparatus may be an SMF entity, and a second network device may be an RAN entity.

The session establishment apparatus 1000 includes: a processor 1001, a transceiver 1002, a memory 1003, and a communications interface 1004, where the processor 1001, the transceiver 1002, the memory 1003, and the communications interface 1004 are connected to each other through a bus 1005.

The processor 1001 may be a central processing unit (CPU), a network processor (NP), or a combination of the CPU and the NP. The processor 1001 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The memory 1003 may include a volatile memory, for example, a random access memory (RAM). The memory may alternatively include a non-volatile memory, for example, a flash memory, a hard disk drive (HDD), or a solid-state drive (SSD). The memory 1003 may alternatively include a combination of the foregoing types of memories.

The communications interface 1004 may be a wired communications interface, a wireless communications interface, or a combination thereof. The wired communications interface, for example, may be an Ethernet interface. The Ethernet interface may be an optical interface, an electrical interface, or a combination thereof. The wireless communications interface may be a WLAN interface.

The bus 1005 may be a peripheral component interconnect (PCI) bus, an extended industry standard architecture (EISA) bus, or the like. The bus may be categorized as an address bus, a data bus, a control bus, or the like. For ease of illustration, in FIG. 8, the bus is represented by using only one double-sided arrow. This, however, does not indicate that there is only one bus or only one type of bus.

The memory 1003 may be configured to store a program instruction. The processor 1001 invokes the program instruction stored in the memory 1003, and may perform one or more steps in the embodiments shown in the foregoing solution.

The processor 1001 is configured to determine whether an air interface resource of a default flow of a packet data unit PDU session is successfully established.

The transceiver 1002 is configured to, based on first information, establish the PDU session in an inactive state or trigger to release the PDU session when the air interface resource of the default flow of the PDU session fails to be established, where the first information is used to indicate whether establishment of the PDU session in the inactive state is allowed when the air interface resource of the default flow of the PDU session fails to be established.

In an optional implementation, the transceiver 1002 is specifically configured to:

obtain a flow list, where the flow list is generated by the second network device based on an establishment result of the air interface resource of the PDU session, and the flow list includes a flow that is in the PDU session and of which an air interface resource fails to be established.

The processor 1001 is specifically configured to determine, based on the flow list, whether the air interface resource of the default flow of the PDU session is successfully established.

In an optional implementation, the first information is a slice/service type SST in subscription data of a terminal corresponding to the PDU session.

Alternatively, the first information is a policy and charging control rule of the terminal corresponding to the PDU session.

Alternatively, the first information is indication information sent by the terminal to the apparatus.

In an optional implementation, the transceiver 1002 is further configured to:

obtain second information, where the second information is used to indicate a time point at which the PDU session in the inactive state is activated.

After establishing, based on the first information, the PDU session in the inactive state, the processor 1001 is further configured to:

activate the PDU session in the inactive state at the time point indicated by the second information.

Alternatively, the transceiver is further configured to send the second indication information to the terminal, where the second indication information is used to indicate that the terminal activates the PDU session in the inactive state at the time point.

In an optional implementation, the transceiver 1002 is further configured to:

obtain third information, where the third information is used to indicate a maximum quantity of times for which the PDU session in the inactive state is activated.

After activating the PDU session in the inactive state at the time point indicated by the second information, the processor 1001 is further configured to:

trigger a procedure of releasing the PDU session if determining that a quantity of times for which the PDU session in the inactive state is activated is equal to the maximum quantity of times.

In an optional implementation, after determining that the air interface resource of the default flow of the PDU session fails to be established, the processor 1001 is further configured to:

if determining, based on the first information, that establishment of the PDU session in the inactive state is not allowed, trigger to establish a user plane resource for the PDU session when determining that at least one flow of which an air interface resource is successfully established exists in at least one flow included in the PDU session; or if determining, based on the first information, that establishment of the PDU session in the inactive state is not allowed, send a quality of service parameter of the default flow to the second network device, and instruct the second network device to establish an air interface resource for the default flow based on the quality of service parameter of the default flow.

In an optional implementation, after establishing, based on the first information, the PDU session in the inactive state, the processor 1001 is further configured to:

release the air interface resource of the flow that is in the PDU session and of which the air interface resource is successfully established.

Figure 11:
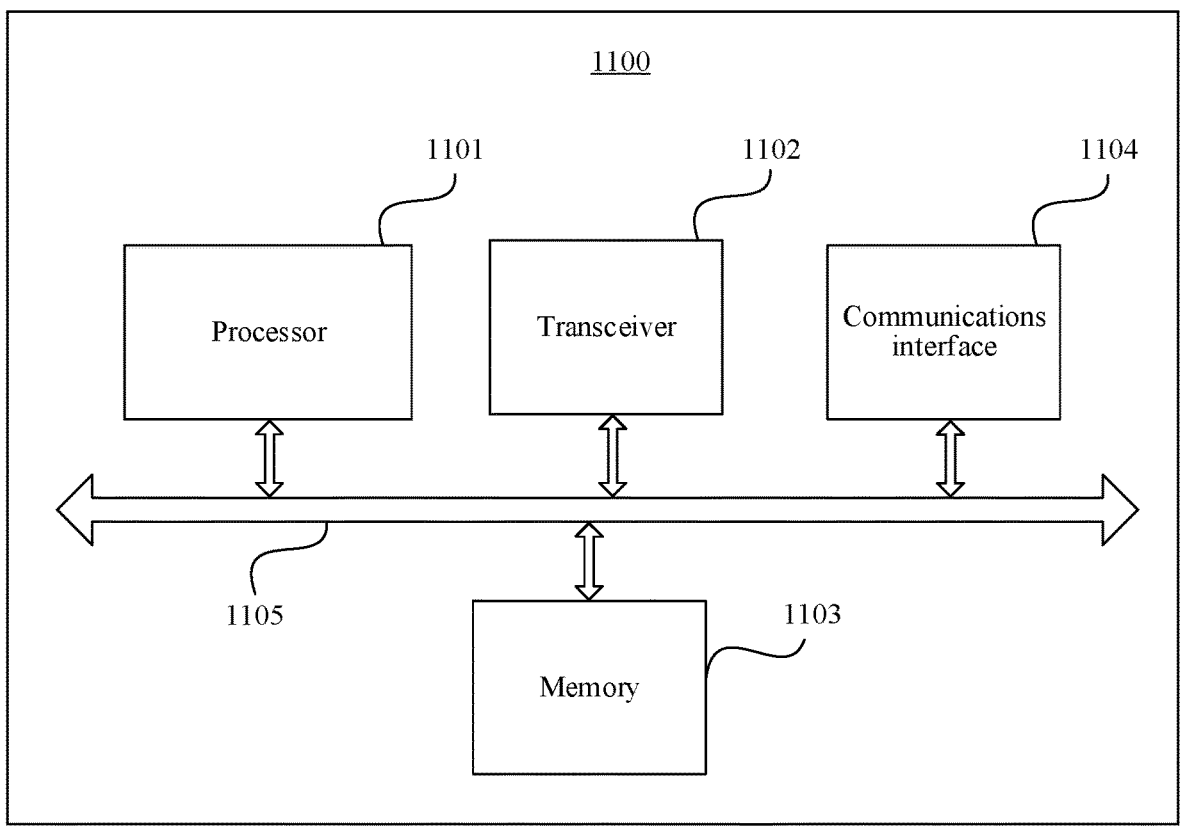
FIG. 11 is a schematic diagram of a session establishment apparatus according to an embodiment of this application.

FIG. 11 is a schematic structural diagram of a session establishment apparatus according to an embodiment of this application. The session establishment apparatus can perform actions of the first network device in the foregoing method embodiments. Optionally, the session establishment apparatus may be an SMF entity, and a second network device may be an RAN entity.

The session establishment apparatus 1100 includes: a processor 1101, a transceiver 1102, a memory 1103, and a communications interface 1104, where the processor 1101, the transceiver 1102, the memory 1103, and the communications interface 1104 are connected to each other through a bus 1105. For detailed content of the modules described above, refer to descriptions of related modules in FIG. 10. Details are not described herein again.

The processor 1101 is configured to determine whether an air interface resource of a default flow of a packet data unit PDU session is successfully established, where the PDU session is in an inactive state.

The transceiver 1102 is configured to, based on first information, maintain the PDU session in the inactive state or trigger to release the PDU session when the air interface resource of the default flow of the PDU session fails to be established, where the first information is used to indicate whether to allow the PDU session to be maintained in the inactive state when the air interface resource of the default flow of the PDU session fails to be established.

Figure 12:
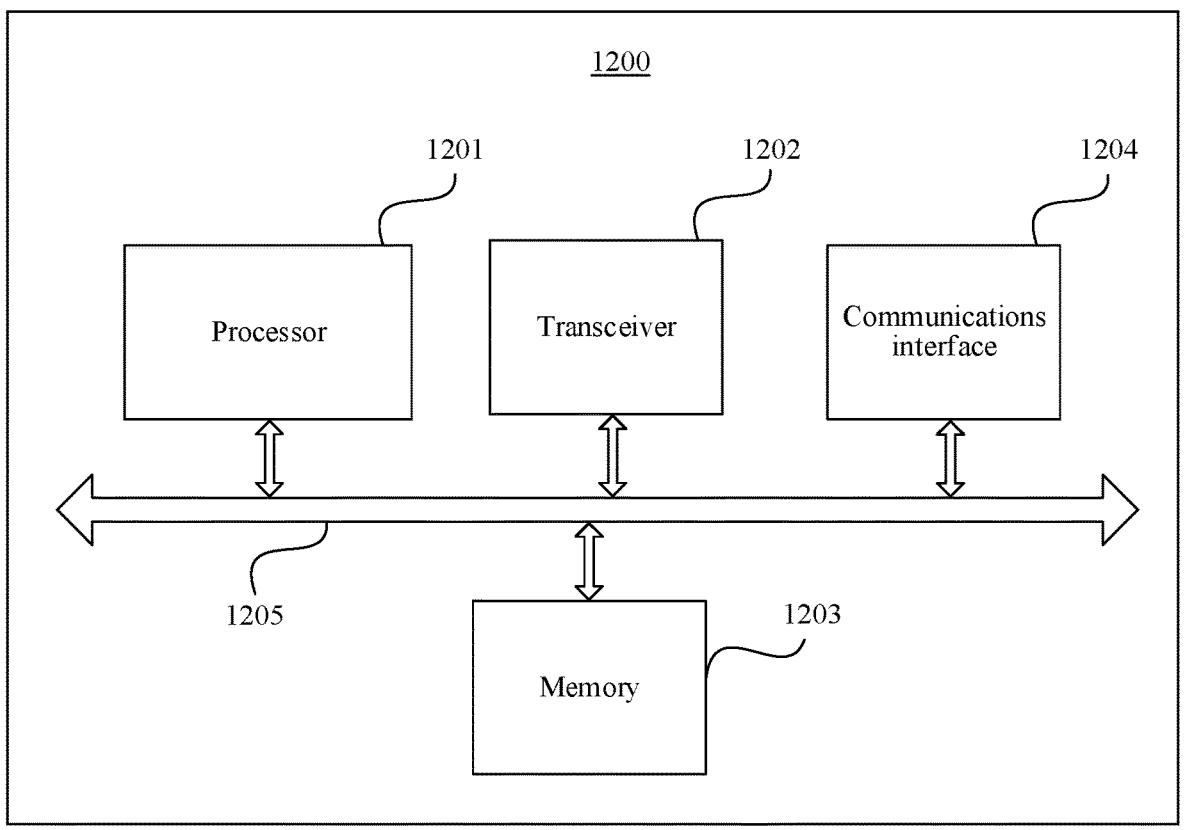
FIG. 12 is a schematic diagram of a session establishment apparatus according to an embodiment of this application.

FIG. 12 is a schematic structural diagram of a session establishment apparatus according to an embodiment of this application. The session establishment apparatus can perform actions of the terminal in the foregoing method embodiments. Optionally, the session establishment apparatus may be an SMF entity, and a second network device may be an (R)AN entity.

The session establishment apparatus 1200 includes: a processor 1201, a transceiver 1202, a memory 1203, and a communications interface 1204, where the processor 1201, the transceiver 1202, the memory 1203, and the communications interface 1204 communicate with each other by using a bus 1205. For detailed content of the modules described above, refer to descriptions of related modules in FIG. 10. Details are not described herein again.

The processor 1201 is configured to generate first information, where the first information is used to indicate whether establishment of a PDU session in an inactive state is allowed when an air interface resource of a default flow of the packet data unit PDU session fails to be established.

The transceiver 1202 is configured to send the first information to a first network device through a second network device.

In an optional implementation, the PDU session is established to be in the inactive state.

The transceiver 1202 is further configured to:

receive second indication information sent by the first network device through the second network device, where the second indication information is used to indicate a time point at which the PDU session in the inactive state is activated; and send an activation request message to the second network device at the time point indicated by the second indication information, where the activation request message is used to request to activate the PDU session in the inactive state.

An embodiment of this application further provides a computer-readable storage medium, configured to store a computer software instruction that the foregoing processor needs to execute. The computer software instruction is included in a program that the foregoing processor needs to execute.

An embodiment of this application provides a computer program product. When a computer reads and executes the computer program product, the computer is enabled to perform the method according to any one of the possible designs.

An embodiment of this application provides a chip. The chip is connected to a memory, and is configured to read and execute a software program stored in the memory, to implement the method according to any one of the possible designs.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including, but not limited to, a disk memory, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A session establishment method, comprising:
 determining, by a first network device, whether an air interface resource of a default flow of a packet data unit (PDU) session is successfully established;
 determining, by the first network device, that the air interface resource of the default flow of the PDU session fails to be established, wherein the determining whether the air interface resource is successfully established comprises:
  obtaining, by the first network device, a flow list, wherein the flow list is generated by a second network device based on an establishment result of the air interface resource of the PDU session, and the flow list comprises a flow that is in the PDU session and for which an air interface resource fails to be established; and
  determining, by the first network device based on the flow list, whether the air interface resource of the default flow of the PDU session is successfully established; and
 in response to determining the air interface resource fails to be established, establishing, by the first network device based on first information, the PDU session in an inactive state or triggering to release the PDU session, wherein the first information indicates whether establishment of the PDU session in the inactive state is allowed.

2. The method according to claim 1, wherein the first information is one of the following (a)-(c):
 (a) a slice/service type (SST) in subscription data of a terminal corresponding to the PDU session;
 (b) a policy and charging control rule of the terminal corresponding to the PDU session; and
 (c) indication information sent by the terminal to the first network device.

3. The method according to claim 1, further comprising:
 obtaining, by the first network device, second information, wherein the second information indicates a time point at which the PDU session in the inactive state is activated; and
 wherein after the establishing, based on the first information, the PDU session in the inactive state, the method further comprises one of the following (a) and (b):
 (a) activating, by the first network device, the PDU session in the inactive state at the time point indicated by the second information; and
 (b) sending, by the first network device, second indication information to the terminal, wherein the second indication information instructs the terminal to activate the PDU session in the inactive state at the time point.

4. The method according to claim 3, further comprising:
 obtaining, by the first network device, third information, wherein the third information indicates a maximum quantity of times for which the PDU session in the inactive state is activated; and
 wherein after the activating, by the first network device, the PDU session in the inactive state at the time point indicated by the second information, the method further comprises:
  determining that a quantity of times for which the PDU session in the inactive state is activated is equal to the maximum quantity of times,
  in accordance with the determining that the quantity is equal to the maximum quantity of times, triggering, by the first network device, a procedure of releasing the PDU session.

5. The method according to claim 1, wherein after the first network device determines that the air interface resource fails to be established, the method further comprises one of the following (a) and (b):
 (a) determining, based on the first information, that establishment of the PDU session in the inactive state is not allowed, and
  determining, that an air interface resource of at least one flow is successfully established in the PDU session,
  in accordance with the determining that the establishment is not allowed and the determining that the air interface resource is established, triggering, by the first network device, to establish a user plane resource for the PDU session; and
 (b) determining, based on the first information, that establishment of the PDU session in the inactive state is not allowed,
  in accordance with the determining the establishment is not allowed, sending, by the first network device, a quality of service parameter of the default flow to the second network device, and instructing the second network device to establish an air interface resource for the default flow based on the quality of service parameter of the default flow.

6. The method according to claim 1, wherein after the establishing, based on the first information, the PDU session in the inactive state, the method further comprises:
 releasing, by the first network device, an air interface resource of a flow of which the air interface resource in the PDU session is successfully established.

7. A session establishment method, comprising:
 determining, by a terminal, that an air interface resource of a default flow of a packet data unit (PDU) session fails to be established;
 in accordance with the determination, generating, by the terminal, first information, wherein the first information indicates whether to allow the PDU session in an inactive state to be established; and
 sending, by the terminal, the first information to a first network device through a second network device,
 wherein in response to the PDU session being established to be in the inactive state, the method further comprises:
 receiving, by the terminal, second indication information sent by the first network device through the second network device, wherein the second indication information indicates a time point at which the PDU session in the inactive state is activated; and
 sending, by the terminal, an activation request message to the second network device at the time point indicated by the second indication information, wherein the activation request message requests to activate the PDU session in the inactive state.

8. A session establishment apparatus, comprising:
 a processor, configured to:
  determine whether an air interface resource of a default flow of a packet data unit (PDU) session is successfully established;
  determine that the air interface resource of the default flow of the PDU session fails to be established; and a transceiver, configured to cooperate with the processor, is configured to:
  obtain a flow list, wherein the flow list is generated by a second network device based on an establishment result of the air interface resource of the PDU session, and the flow list comprises a flow that is in the PDU session and for which an air interface resource fails to be established,
wherein the processor is further configured to:
  determine, based on the flow list, whether the air interface resource of the default flow of the packet data unit PDU session is successfully established, and
wherein the transceiver, configured to cooperate with the processor, is further configured to:
  based on first information, and in response to determining that the air interface resource fails to be established, establish the PDU session in an inactive state or trigger to release the PDU session, wherein the first information indicates whether establishment of the PDU session in the inactive state is allowed.

9. The apparatus according to claim 8, wherein the first information is one of the following (a)-(c):
  (a) a slice/service type (SST) in subscription data of a terminal corresponding to the PDU session;
  (b) a policy and charging control rule of the terminal corresponding to the PDU session; and
  (c) indication information sent by the terminal to the apparatus.

10. The apparatus according to claim 8, wherein the transceiver is further configured to cooperate with the processor to:
  obtain second information, wherein the second information indicates a time point at which the PDU session in the inactive state is activated; and
  after establishing, based on the first information, the PDU session in the inactive state, the processor is further configured to
  activate the PDU session in the inactive state at the time point indicated by the second information; or
  the transceiver is further configured to send second indication information to the terminal, wherein the second indication information instructs the terminal to activate the PDU session in the inactive state at the time point.

11. The apparatus according to claim 10, wherein the transceiver is further configured to cooperate with the processor to:
  obtain third information, wherein the third information indicates a maximum quantity of times for which the PDU session in the inactive state is activated;
  after activating the PDU session in the inactive state at the time point indicated by the second information, the processor is further configured to:
  determine, that a quantity of times for which the PDU session in the inactive state is activated is equal to the maximum quantity of times; and
  in accordance with the determining the quantity is equal to the maximum quantity of time, trigger a procedure of releasing the PDU session.

12. The apparatus according to claim 8, wherein after determining that the air interface resource of the default flow of the PDU session fails to be established, the processor is further configured to implement one of the following (a) and (b):
  (a) determining, based on the first information, that establishment of the PDU session in the inactive state is not allowed, and determining that an air interface resource of at least one flow is successfully established in the PDU session;
  in accordance with the determining that the establishment is not allowed and the determining that the air interface resource is established, triggering to establish a user plane resource for the PDU session; and
  (b) determining, based on the first information, that establishment of the PDU session in the inactive state is not allowed,
  in accordance with the determining that the establishment is not allowed, sending a quality of service parameter of the default flow to the second network device, and instructing the second network device to establish an air interface resource for the default flow based on the quality of service parameter of the default flow.

13. The apparatus according to claim 8, wherein after establishing, based on the first information, the PDU session in the inactive state, the processor is further configured to:
  release the air interface resource of the flow that is in the PDU session and of which the air interface resource is successfully established.

* * * * *